(12) United States Patent
Ocean et al.

(10) Patent No.: US 11,776,577 B2
(45) Date of Patent: Oct. 3, 2023

(54) CAMERA TRACKING SYSTEM FOR LIVE COMPOSITING

(71) Applicant: Mean Cat Entertainment LLC, Burlington, VT (US)

(72) Inventors: Donnie Ocean, Burlington, VT (US); Michael Batty, Burlington, VT (US); John Hoehl, Burlington, VT (US)

(73) Assignee: Mean Cat Entertainment LLC, Burlington, VT (US)

( * ) Notice: Subject to any disclaimer, the term of this patent is extended or adjusted under 35 U.S.C. 154(b) by 60 days.

(21) Appl. No.: 17/762,442

(22) PCT Filed: Sep. 22, 2020

(86) PCT No.: PCT/US2020/070564
§ 371 (c)(1),
(2) Date: Mar. 22, 2022

(87) PCT Pub. No.: WO2021/056030
PCT Pub. Date: Mar. 25, 2021

(65) Prior Publication Data
US 2022/0351751 A1 Nov. 3, 2022

Related U.S. Application Data

(60) Provisional application No. 62/903,860, filed on Sep. 22, 2019.

(51) Int. Cl.
*G11B 27/031* (2006.01)
*H04N 17/00* (2006.01)

(52) U.S. Cl.
CPC ......... *G11B 27/031* (2013.01); *H04N 17/002* (2013.01)

(58) Field of Classification Search
CPC .......................... G11B 27/031; H04N 17/002
See application file for complete search history.

(56) References Cited

U.S. PATENT DOCUMENTS

| 4,305,131 A | * | 12/1981 | Best | A63F 13/47 |
| | | | | 704/E21.02 |
| 2010/0208087 A1 | * | 8/2010 | Ogawa | H04N 23/68 |
| | | | | 348/208.4 |

(Continued)

FOREIGN PATENT DOCUMENTS

KR WO 2019/112182 * 6/2019 ........... G06F 1/1605

*Primary Examiner* — Mishawn N. Hunter
(74) *Attorney, Agent, or Firm* — STGIP, LLC; Shawn Gordon

(57) ABSTRACT

A 3D camera tracking and live compositing system includes software and hardware integration and allows users to create, in conjunction with existing programs, live composite video. A video camera, a tracking sensor, encoder, a composite monitor, and a software engine and plugin receive video and data from and integrate it with existing programs to generate real time composite video. The composite feed can be viewed and manipulated by users while filming. Features include 3D masking, depth layering, teleporting, axis locking, motion scaling, and freeze tracking. A storyboarding archive can be used to quickly load scenes with the location, lighting setups, lens profiles and other settings associated with a saved a photo. The video camera's movements can be recorded with video to be later applied to other 3D digital assets in post-production. The system also allows users to load scenes based on a 3D data set created with LIDAR.

2 Claims, 12 Drawing Sheets

(56) References Cited

U.S. PATENT DOCUMENTS

| | | | |
|---|---|---|---|
| 2011/0216167 A1* | 9/2011 | Katz | H04N 13/246 |
| | | | 348/47 |
| 2013/0128110 A1* | 5/2013 | Jannard | H04N 23/00 |
| | | | 348/375 |
| 2014/0168354 A1* | 6/2014 | Clavel | H04N 7/152 |
| | | | 348/14.09 |
| 2015/0016680 A1* | 1/2015 | Mack | G06T 15/80 |
| | | | 382/103 |

* cited by examiner

CAMERA TRACKING SYSTEM FOR LIVE COMPOSITING

FIELD OF THE INVENTION

The present invention generally relates to camera tracking in virtual environments, compositing in such environments, and providing a platform for broadcasting or live streaming virtual output.

BACKGROUND

Currently, systems for mixed reality camera tracking within virtual sets/environments and/or for live compositing of mixed reality require significant equipment that can take days to set up, which can be very expensive. Alternatively, a studio that has such equipment in place may be used, but such studios are not mobile and may have limited availability. In addition, to have precise camera movement without unreasonable height or motion limitations, a live compositing production requires complex equipment, such as a motion control system. Further, these camera tracking systems require hundreds if not thousands of physical trackermarkers to be strategically placed throughout the production space for camera orientation and calibration. Numerous trained individuals are needed to operate this kind of equipment and manage the workflow.

Existing software programs for virtual and mixed reality have limited tools and lack user-friendly interfaces, requiring a user to combine several different technologies to achieve a professional result.

In virtual sets, actors need to be surrounded by a green screen in order to camera-pan inside the virtual environment. Once the camera view encounters anything but the green screen, the chroma key breaks the environment and composite, showing whatever is in the physical space rather than the virtual environment.

There are other limitations with chroma keying, including the inability to have virtual objects occlude the composited video.

Current chroma key methods require filming against a color, such as a green or blue screen. To remove backgrounds without a green or blue screen requires a process known as rotoscoping, which is difficult and time-consuming since the background of each frame must be cut out individually.

Virtual cameras and physical cameras need to be accurately matched through lens simulation. Therefore, chromatic aberration and lens distortion, lens placement in reference to the camera's sensor, sensor size, and focal length measurements must all match precisely. Without dynamic lens and camera calibration, virtual cameras and lenses will not distort in the same way that the physical cameras and lenses do when recording actors in live composites against a green screen. This mismatch of capture of lens distortion between the virtual and physical cameras breaks the illusion of the composited actors actually being in the virtual set and in-turn reduces the quality of the live composite. Current systems do not include a user-friendly and inexpensive way to achieve the required matching.

Current camera tracking packages do not include inexpensive and easy to use synchronized focusing and focal length zoom tools between virtual and physical camera lenses. In many systems, a user is limited to simply using manual focus on a single subject.

In current virtual camera tracking software and hardware, there is not an easy and inexpensive way to save a shot-setups as a preset and then later teleport back to load the same shot with the same camera settings and position coordinates. One has to manually re-adjust each of the camera's position coordinates, camera settings, and scene settings per shot, every time a scene is re-shot. All of the settings and coordinates must also be documented manually for reference in order to achieve the same shot within a virtual set.

In current systems, cranes and other camera leveling hardware are usually needed to keep a virtual camera locked from moving on any particular axis or axes of movement.

In current systems, the virtual camera's movement is limited to actual scale and so a crane may be needed to properly capture a shot from a high to a lower position.

SUMMARY OF THE DISCLOSURE

A method of camera tracking and compositing is provided that includes receiving a video feed from a video camera, receiving positional data of the video camera from a tracking device attached to the video camera, receiving lens parameter data from an encoder connected to a lens of the video camera, generating an intrinsic calibration file based on the lens parameters and the video feed, generating an extrinsic calibration file based on the positional data and the video feed, generating a room scale calibration file based on the lens parameters, the positional data, and the video feed, generating a composite video feed from the video feed and a virtual camera, wherein a plurality of lens distortion parameters of the virtual camera are set based on the intrinsic calibration file, and displaying the composite video in real time.

A camera tracking and live compositing system is provided that includes a video camera having a lens, a positional tracking device attached to the video camera, and an encoder attached to the lens, wherein the encoder is configured to track lens parameters of the lens, including a focal length, an aperture, and a focal distance. A composite monitor is connected to the system and a processor is configured to receive a video feed from the video camera, positional tracking data from the positional tracking device, and the lens parameters from the encoder and to output a composited video feed to the composite monitor in real time. The composite video feed includes the video camera feed and virtual elements from a virtual camera, the virtual elements from the virtual camera include at least one object that is positioned within a scene of the composite video based on video and tracking offsets derived from positional data from the tracking device, the virtual elements are constructed using virtual lens distortion parameters derived from the lens parameters, and the virtual elements are scaled based on a geometry scale derived from the positional tracking data, the video feed, and lens parameters.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DESCRIPTION OF THE DISCLOSURE

Figure 1:
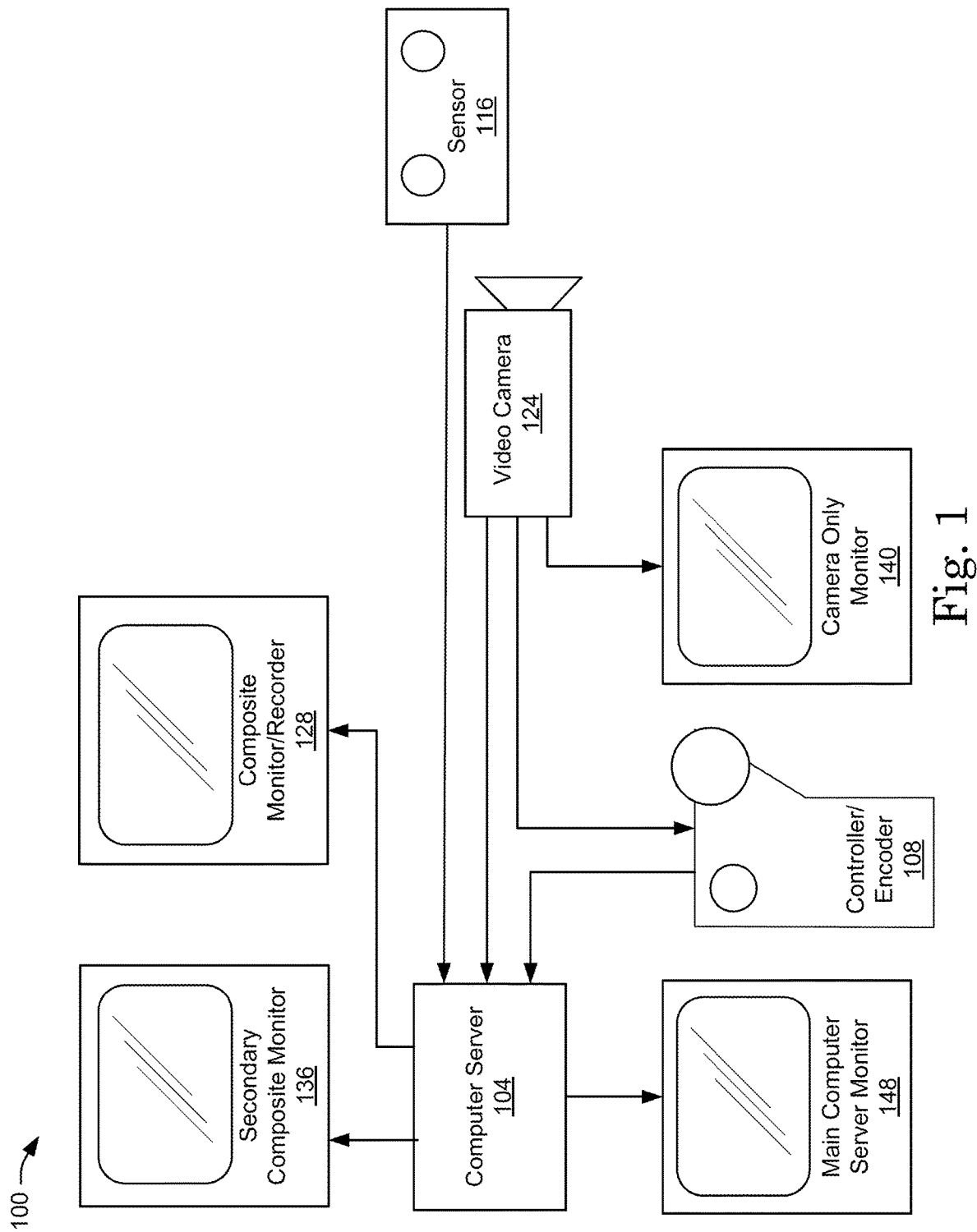
FIG. 1 is a schematic overview of components of a virtual and mixed reality camera tracking system for live compositing in accordance with an embodiment of the present invention.

A 3D camera tracking and live compositing system includes software and hardware integration that allows users to create, in conjunction with existing real time 3D programs, high quality live composites simply and inexpensively. This virtual and mixed reality camera tracking system enables live compositing and includes one or more of the bellow features without the need for complex equipment, tracking markers, or specialized studio space.

The 3D camera tracking and live compositing system may include a 3D masking capability that excludes areas outside the chroma key matte, so that filming can be done against a chroma screen of limited size. With this feature, an actor inside the virtual set can be captured without having to be entirely surrounded by a green screen.

The 3D camera tracking and live compositing system may include saving of detailed coordinates of camera position and other parameters throughout the duration of the time of capture/recording, which can be used for making adjustments later, such as adding visual effects that are synchronous with the camera movements.

The 3D camera tracking and live compositing system may include user interface that includes camera controls, focal length, aperture, aspect ratio, LUT loader, film grain, time code, masking tools, depth layering tools, chroma key, focus tools, compositing tools, screenshot/storyboarding and save preferences toolset, teleport tools, stabilization tools, axis lock, motion scaling, and freeze tracking.

The 3D camera tracking and live compositing system may include depth occlusion layering that allows a user to specify different "depth slices or layers" of the rendered scene.

The 3D camera tracking and live compositing system may include an adjustable compositing matte within the 3D scene that allows a user to adjust the size of the green screen/chroma key window so that a full green screen effect with a matte in the virtual world can be composited with only a small section of green screen. This allows a user to film real actors within a virtual set even if limited to a relatively small green screen area. Chroma color, matte strength, luminance values, edge blurring, and other mask/matte parameters and traditional visual influences can be adjusted.

The 3D camera tracking and live composting system may include a depth compositing tool that uses stereo cameras, LIDAR, and both stereo cameras and LIDAR to generate depth maps, which allows imagery to be removed at any selected depth. Visual elements are separated from a video data-set based on ranges of depth data. Therefore, the need for a chroma key could be unnecessary or could assist in refining a chroma matte. This depth tool can be set to a particular depth range so that everything out of that depth range is discarded.

The 3D camera tracking and live composting system may include controlling the virtual camera's position and movement using input devices such as keyboard/mouse, gamepad or custom controller, users can navigate through the space of the virtual set and reposition starting points, placements, or teleport points within the virtual environment.

The 3D camera tracking and live composting system may include a series of presets allows for simple and precise camera and lens calibrations for a variety of lens and camera bodies.

The 3D camera tracking and live composting system may allow a user to adjust focal length or aperture manually from the user interface. The focal length or aperture may also be changed by rotating a hardware dial or by communicating with supported follow focus devices.

In the 3D camera tracking and live composting system, video formats and camera parameters are provided that are calibrated to match those of commonly available video cameras.

In the 3D camera tracking and live composting system, a user can set the transparency of the footage being captured (e.g., from 0-100%) as well as manually pull and change focus via a hardware dial. When using this focus feature, a mostly-transparent box may appear within the camera view to indicate what is in focus, i.e., everything inside the box is in focus and everything outside has fallen out of focus. This box adjusts with aperture and focal lengths automatically. There are four types of focus: manual, encoder, object focus, and distance. For manual focus, the focal distance is set in a 3D engine. The encoder focus is driven by a hardware encoder device. Object focus is when an object is selected in a virtual 3D scene to always be kept in focus. For distance focus, a defined distance is set to keep in the focus represented by a transparent cube in scene. Focus is a combination of focal distance and aperture, which interact to create a focal depth.

In the 3D camera tracking and live composting system, a track selected object feature allows a user to use an automatic focus setting that keeps any pre-selected object in focus at all times regardless of camera movement. An automatic focus feature allows a user to have the virtual camera automatically focus on whatever is in the main view. A focus distance slider solution feature allows a user to focus using the tools on the desktop user interface.

In the 3D camera tracking and live composting system, a teleport feature allows a user to record camera position coordinates and camera settings throughout virtual sets/locations. This feature records and saves the virtual camera location coordinate as an archive of presets. Those presets are assigned to shortcut keys and allow the user easy access to the same parameters that were used when the shot was taken and saved, including to the same camera locations, camera settings, and scene settings. A set teleport point feature allows a user to set a point in space, inside the virtual set, to later be able to teleport the virtual camera too. The teleport points also save all of the camera settings as a preset to that teleport point so that one can switch between shot choices, including to camera locations and camera settings. A save teleport points feature allows the coordinates of a camera location inside a virtual set to be captured so that the user can reposition the camera back to those coordinates. A load teleport points feature allows predetermined location coordinates to be loaded into a virtual scene, and any of these teleport coordinates can be deleted by the user at any time.

In the 3D camera tracking and live composting system, a screenshot feature works in conjunction with the teleport point feature, allowing the user to capture images within the virtual set. Each image file may contain saved data of positional coordinates, along with the camera settings and scene settings that were present within that image capture of the virtual set. A load storyboard feature allows a user to load the positional data, camera settings, and scene settings. It also readjusts camera settings and scene settings to those that were used at the time of the storyboard capture.

In the 3D camera tracking and live composting system, a stabilization feature allows a user to create and adjust a movement smoothing curve to the positional data, so that the sensor may be less sensitive, which allows the video capture to be more fluid and smoother. A stabilized transform feature allows a user to control the sensitivity of camera movement within the virtual world, and is adjustable on each axis (e.g., 0-100%).

In the 3D camera tracking and live composting system, an axis locking feature allows a user to lock or unlock any direction of movement of a desired axis or combination of axes of the camera, which helps control undesired movement during video capture. For example, the following settings may be used (with zero being set at point of axis lock), truck (transform x-axis), dolly (transform z-axis), boom (transform y-axis), tilt (rotate y-axis), pan (rotate x-axis), and Dutch (rotate z-axis).

In the 3D camera tracking and live composting system, a motion scale feature allows the scale of the camera's movement to be changed. The motion scale feature is adjustable for any selected single axis or combination of axes. A truck (x-axis) scale feature scales the distance of movement to be bigger or smaller on the x-axis. For example, in a regular mode, moving the tracker core sensor 1 cm creates the movement of 1 cm in the virtual set. However, using the truck scale feature, 1 cm can be set as 1 meter and will move through the virtual set 1 meter for every centimeter that the tracker core sensor is moved on the x-axis. A dolly (z-axis) feature scales the distance of movement to be bigger or smaller on the z-axis. (For example, moving the tracker core sensor 1 cm creates the movement of 1 cm in the virtual set. However, using the dolly feature, 1 cm can be set as 1 meter and will move through the virtual set 1 meter for every centimeter that the tracker core sensor is moved on the z-axis.) A boom (y-axis) feature scales the distance of movement to be bigger or smaller on the y-axis. For example, moving the tracker core sensor 1 cm creates the movement of 1 cm in the virtual set. However, using the boom feature, 1 cm can be set as 1 meter and will move through the virtual set 1 meter for every centimeter that the tracker core sensor is moved on the y-axis.

In the 3D camera tracking and live composting system, a freeze tracking feature disables tracking, allowing the user to move and reposition the camera. While tracking is frozen, movement will not affect the camera position in the virtual space. When ready to resume filming, the camera tracking sensor can be re-engaged. Settings can be saved and loaded to be reused as needed.

In the 3D camera tracking and live composting system, a controller and incremental encoder attachment for a lens or follow focus rig can be used to control focus, aperture, shutter, as well as camera tracking and live composite features. An attachment connects to the lens via a toothed gear or through a LEMO connection to a follow focus, allowing a user to control with his/her hand camera and lens adjustments on both the virtual and physical camera simultaneously. It can also control the virtual camera or the video camera independently.

In the 3D camera tracking and live composting system, a housing for components of the system may also serve as an attachment plate. The housing may also be used to accommodate smartphones.

The above features are realized via a virtual and mixed reality camera tracking system for live compositing. As used herein, "video camera" will be used to refer to a real, physical, or cinema camera for the purpose of distinguishing from a virtual camera.

Turning to the figures, and in particular to FIG. 1, a schematic overview of components of a virtual and mixed reality camera tracking system 100 is shown. Camera tracking system 100 may include a computer server 104, a controller/encoder 108, a sensor 116, a video camera 124, a composite monitor 128, which may include a composite recorder and a memory, a second composite monitor 136, a camera-only monitor 140, a memory, and a computer server monitor 148. Sensor 116 is attached to video camera 124 and tracks the position of video camera 124 and sends camera positional tracking data to server 104. Controller/encoder 108 allows an operator to manage camera tracking and live composite features (discussed below). Encoder 108 is placed on or connected to the lens of video camera 124 via an encoder camera lens attachment and is configured to track the focal length, aperture, and focal distance of the lens and provide this information to server 104 so that lens adjustments can be synchronized between video camera 124 and a virtual camera that generates images for compositing.

A video signal is sent from video camera 124 to server 104 (for compositing by engine 105) as well as to camera-only monitor 140 (so the real portion of the video can be monitored separately from the live composited feed). In addition, positional tracking data from sensor 116 (and data from an optional second sensor) is sent to server 104 along with input and information acquired from controller/encoder 108. At server 104, the video signal is combined with graphics (i.e., virtual overlays, objects, backgrounds, etc.) based on the positional tracking data received from sensor 116 as well as input data and information from encoder 108 to generate a composite video feed in real time that is sent to composite monitor 128. In this way, the operator of video camera 124 may view the composite video while filming. In addition, the composite video feed may be sent to a second composite monitor 136 so that other users can view the composite video in real time. Further, the composite video feed may be recorded by a composite recorder and stored in memory, allowing the composite feed to be recorded as filming occurs. Computer server monitor 148 functions as a master control platform, allowing an operator to access the features and parameters of the compositing program contained in server 104. Server 104 receives, transmits, and records positional tracking data, video feed input, calibration information, metadata and depth input.

Server 104 includes an engine 105 and is connected to controller/encoder 108, sensor 116, video camera 124, composite monitor/recorder 128, second composite monitor 136, memory, and computer server monitor 148 via cables or wireless transmitters (discussed further below). Compositing of real video from video camera 124 and virtual images occurs at server 104 via engine 105. In this way, operators can, through, for example, a plugin 332 (included in FIG. 3), visually interact with art and software available in server 104, including commercially available programs, such as those available from Unreal Engine, Unity 3D, Maya, 3Ds Max, Blender, Flame, and Nuke, for example. Visual elements that can be used with the video include virtual environments, effects, and motion graphics.

A real-time composite video is generated based on the above input feeds by engine 105 together with plugin 332 that works with any of a variety of 3D programs to create a real time mixed reality worldview video feed 111 that is sent to composite monitor 128. The composite is readily adjustable with camera tracking and live composite software. Users can make adjustments in a user interface that is displayed on composite monitor 128. In this way, a camera operator or other user can make adjustments while filming. The composite output feed can be recorded while filming by the composite recorder, which may be stored in memory. The composite output feed can also be sent to other monitors, such as the second composite monitor 136, so that the feed can be viewed in multiple locations.

Controller/encoder 108 may include an incremental encoder dial, a 2-axis analogue joystick, and an adjustable-length slider and mounting bracket. Controller/encoder 108 includes a processor, which may be a mini computer or microcontroller. Controller/encoder 108 allows users to interact with camera tracking and live composite software in server 104 as controller data and inputs are sent to server 104 and to composite monitor 128, where an interactive visual representation of the user interface is displayed. This allows users to make selections and adjustments to alter and control the composite parameters.

A selection tool may be included on controller/encoder 108 as well as an incremental encoder dial that can also be used as a navigation tool for scrolling through features and also for making small or large incremental adjustments to the composite via camera tracking and live compositing software on engine 105 and plugin 332. Also, a dial linked to encoder 108 can be engaged to a lens and/or a standard follow focus so that the lens adjustments between video camera 124 and the virtual camera can be synchronized. The dial collects incremental input data from the movements of the follow focus and/or a lens during lens adjustments. All of these interactions are monitored and sent to server 104, and are then sent and displayed on composite monitor 128. This information is used to enhance or alter video generated from video camera 124 by the virtual camera so that any virtual additions or changes appear in a composite video with correlated scale, lens distortions, and frame ratios.

Sensor 116 is a positional tracking sensor, and may be based on simultaneous location and mapping (SLAM), inertial, or GPS based tracking, for example. Sensor 116 can be linked to server 104 by cable and/or wireless transmitters. Sensor 116 tracks its position relative to the environment around it through time, resulting in a data-stream of coordinates that is sent to server 104 as well as composite monitor 128. This allows the user to move throughout virtual sets in scale, as well as place other virtual assets in the composite that track in the virtual space. This positional tracking data can be manipulated in the camera tracking and live composite software, enabling the user to change the scale of movement, interact with the depth layering tool and lock axes. In addition, the location of objects and actors in a scene may be mapped within the real environment over time so that virtual objects can be placed and interact with those objects and actors realistically in the mixed reality video.

Sensor 116 allows users to access features that would not otherwise be available with a single positional tracking sensor. Sensor 116 may also include a spatial recognition tool, such as a LIDAR scanning tool. Sensor 116 allows for the creation of a much stronger chroma key and can allow for keying out visual information with depth rather than requiring a green screen. In addition or in the alternative, additional sensors may be included. For example, a second sensor may be positioned and configured to track positional information specific to the lens of video camera 124. In addition, another position tracking sensor that may be used with another camera or as a second sensor that allows users to access features that would not otherwise be available with a single positional tracking sensor.

Video camera 124 delivers a video feed that includes lens parameters, a camera sensor, aperture, and shutter, framerate (fps) and sensor format ratio. Video camera 124 can be linked to server 104 by cable and/or wireless transmitters. Virtual camera configurations can be used to match the configurations of video camera 124 so that users can synchronize the video camera setups with the virtual camera configurations, allowing for live compositing because the configurations of the virtual cameras within the software will be matched up with the user's video camera configurations.

Composite monitor 128 is connected to server 104 by cable and/or wireless transmitters and allows a user to view the composite feed as well as a user interface as displayed on composite monitor 128. This user interface view can be switched on and off. When on, users can see and adjust the various controls to modify the live composite as desired by controlling controller/encoder 108. Composite monitor 128 may include or be connected to a composite recorder. The user can select to record the composite video by either a button on the monitor, a sync to a record button on video camera 124, or through controller/encoder 108. Once the record button is triggered, the composite video begins to be recorded. In the metadata, and/or by way of server 104, the coordinates of video camera 124 are also recorded so that the footage can be worked on in post-production with a track of movement coordinates, making it easier in post-production to match virtual art to video/images captured by video camera 124 and the virtual cameras' movements. As such, the live composite video is recorded along with other information, including the virtual camera settings of each shot, positional information, and virtual lighting arrangements.

Second composite monitor 136 is similar to composite monitor 128 and allows for multiple viewing stations of the composite. Second composite monitor 136 can be tethered from composite monitor 128 or from server 104 by cable and/or wireless transmitters.

Camera-only monitor 140 receives data/video feed from video camera 124 via cable and/or wireless transmitters and allows for multiple viewing stations of the video camera feed.

Computer server monitor 148 connects, displays, and gives users access to server 104 and includes controls for the features of system 100, including those also accessible from composite monitor 128.

Figure 2:
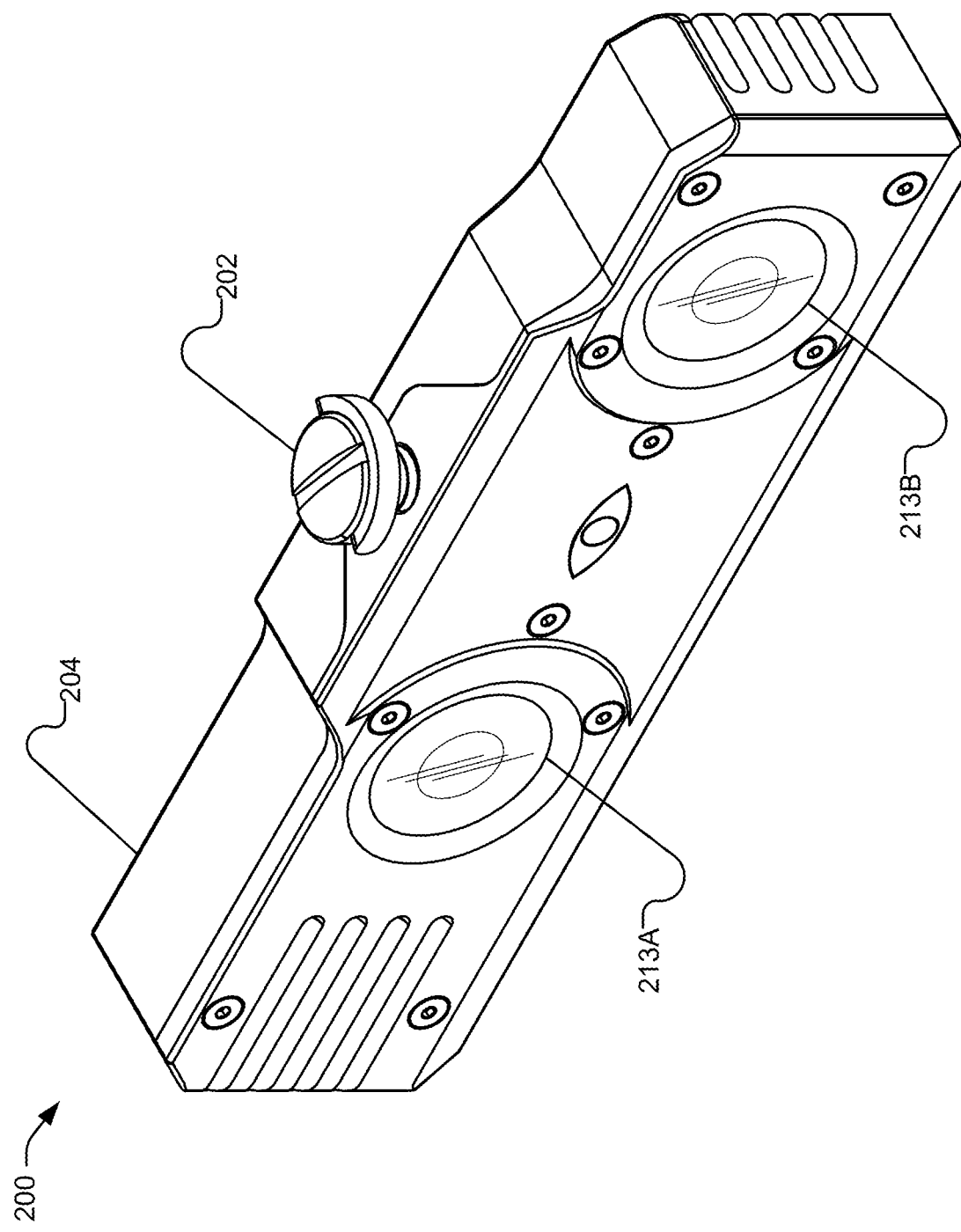
FIG. 2 is a perspective view of a tracker for attaching to a video camera in accordance with an aspect of the present invention.

An exemplary tracker device 200 is shown in FIG. 2. Tracker device 200 may include an enclosure 204, such as a rugged aluminum enclosure, having a mount 202. Within tracker 200 are an interposer and a tracking module 212 (not shown in FIG. 2). Interposer is configured to interface with a USB interposer that connects with a server, such as server 104. Tracking module 212 is a markerless SLAM and/or LIDAR based positional tracking device that uses high precision visual inertial odometry, simultaneous localization, and mapping algorithms in combination with an inertial measurement unit to record accurate measurement of rotation and acceleration of the device. Tracking module 212 includes stereo cameras 213 (e.g., 213A, 213B). Enclosure 204 may include multiple points (e.g., additional mounting hardware) to allow for mounting to a variety of video camera systems. Once tracker device 200 is mounted in line with the chosen camera system, the positional data is transmitted to server 104.

Tracker 200 determines position by any suitable technique including one or more of GPS, gyroscope, Inertial Measurement Unit, LIDAR, data from a camera sensor, and combinations thereof to observe an environment's real features, calculate the camera's position/orientation, and then apply that data to the virtual camera to track objects within both the physical and virtual environment. Tracker 200 uses a combination of image processing and a model based approach to determine position and orientation of the video camera and/or the objects. The model based approach extracts edges and features of physical world objects, e.g., of actors, from the video frames and compares these edges and features to the edges and features found in the 3D model images, frame by frame. The comparison results in pairs of features referred to as correspondences. These correspondences are used to estimate the camera's position and orientation. These results are continuously refined until reaching a threshold defined by a similarity measure.

Figure 3:
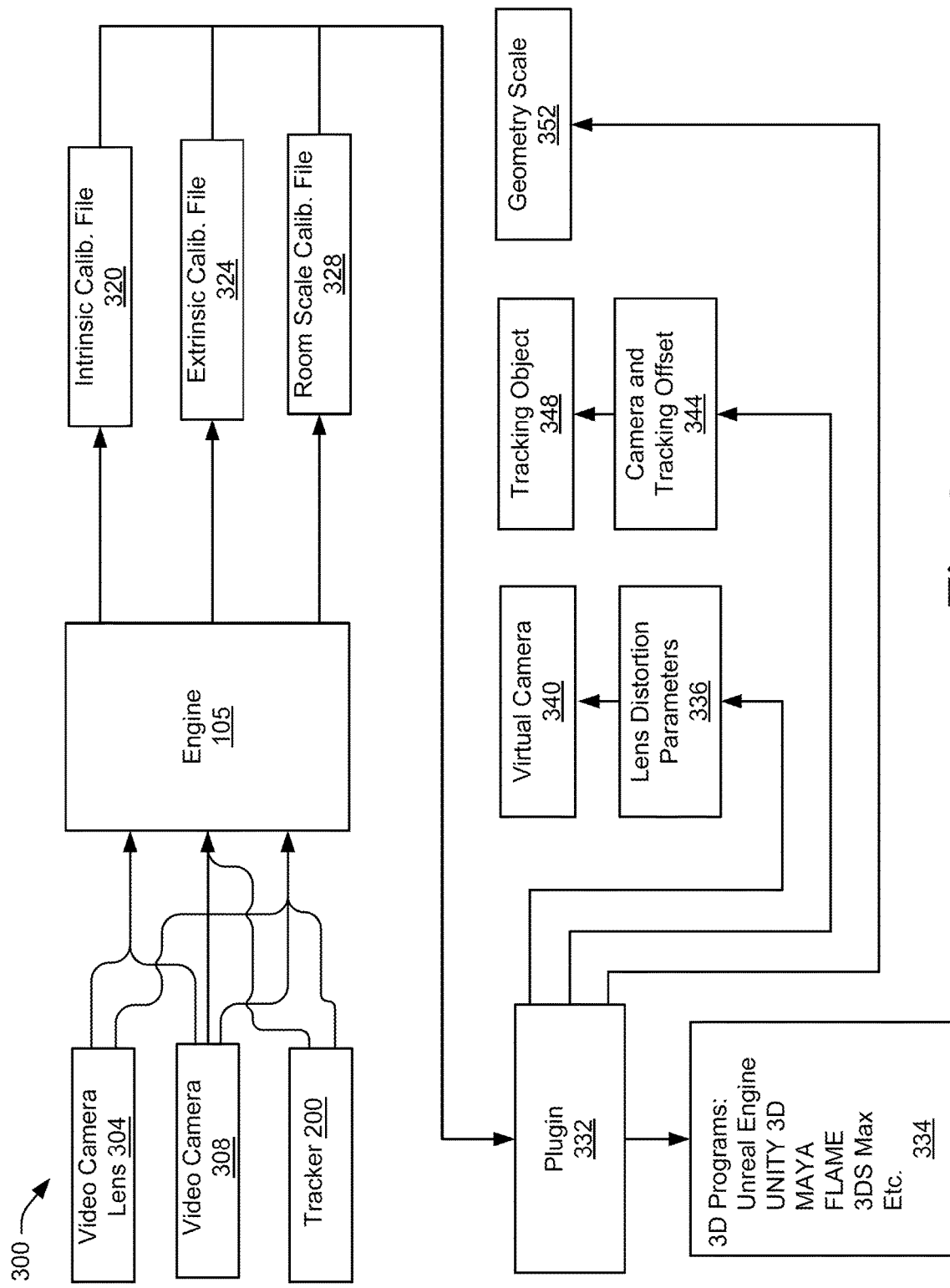
FIG. 3 is a process diagram for calibrating data from a video camera, a video camera lens, and a tracker to facilitate camera tracking and live compositing in accordance with an embodiment of the present invention.

Data acquired from and about the video camera, the video camera lens and the tracker is processed by engine 105 to calibrate parameters for the virtual camera, virtual objects included in a composite video, and geometric scales for scenes/rooms. As shown in FIG. 3, a process 300 is used to determine and set intrinsic, extrinsic, and room scale parameters. Data from video camera lens 304, video camera 308, and positional tracker 200 (preferably attached to the video camera) is sent to server 104 where intrinsic, extrinsic, and room scale calibrations of the cameras and lenses to the tracker are made. Server 104 creates, saves, and distributes calibration files as a shareable calibration library. An exemplary virtual and mixed reality camera tracking system includes multiple pre-determined virtual camera configurations, each corresponding to a particular video camera or to type of video camera. In this exemplary embodiment, a user can select a pre-determined virtual camera configuration corresponding to the user's video camera and use the predetermined virtual camera configuration to synchronize the user's video camera setup with a virtual camera of the system.

An intrinsic algorithm uses data from video camera 308 and video camera lens 304 to generate an intrinsic calibration file 320. An extrinsic algorithm uses data from video camera 308 and tracker 200 to generate an extrinsic calibration file 324. A room scale algorithm uses data from video camera 308, video camera lens 304, and tracker 200 to generate a room scale calibration file 328. These calibration files generate profiles that can be used via a plugin 332 in conjunction with various real time virtual reality engines and software packages 334 with 3D packages with simulated cameras. The calibration data is used to adjust or configure three aspects of virtual cameras: lens and sensor intrinsic distortion, tracker and camera extrinsic relationship, and room scale relationship of camera and set. The three aspects of the virtual cameras are adjusted or configured so that images of virtual objects are rendered such that they appear to have been captured with the same or similar video camera that captures the physical world objects, thereby improving the composting of physical world and virtual objects. In this way, intrinsic calibration file 320 is used to set lens distortion parameters 336 of virtual camera 340, extrinsic calibration file 324 is used to determine camera and tracker offsets 344 for tracking object 348, and room scale calibration file 328 is used to set a geometric scale 352 for the 3d geometry and lighting aspects of a room/scene.

Lens and camera sensor distortion models (the intrinsic distortion calibration parameters) represent projective transformations of the 3D camera's coordinates into 2D image coordinates. The intrinsic parameters include focal length, principle point, and the skew coefficient, as well as radial and tangential lens distortions.

The intrinsic lens calibration process simulates the video camera lens by modeling the lens properties of any physical camera and lens combination and applying those properties to the virtual camera in real time. A set up interface guides a user step by step through the process of taking several calibration images to calculate the calibration/distortion matrix. This involves being prompted to display a chessboard or fiducial marker (referred to as a calibration board) to the camera and tracker in various positions and orientations while images are captured that are used to create a lens profile. This calibration process generates profiles that are sent by engine 105 to plugin 332 that can be applied to various real time engines and other 3D packages with simulated cameras.

Extrinsic calibration may be captured simultaneously with the same data set as the intrinsic calibration. Extrinsic calibration aligns the tracker to the video camera lens's nodal point, thereby creating a 1:1 correspondence between the virtual camera and the video camera position in space and accounting for the offset between the tracker's center and the center of the video camera lens.

The extrinsic room scale calibration calculates the scale, starting or zero point of starting position and the recording stage's volume, allowing for the establishment of a consistent ground-plane in the virtual environment and the composited actor's environment. This is done after the intrinsic and extrinsic calibration, and can be implemented through the setup interface. The user displays a calibration board placed in the production volume in a consistent place and images are captured of the board in each position. These images are used to scale the virtual environment to the real-world scale.

Figure 4:
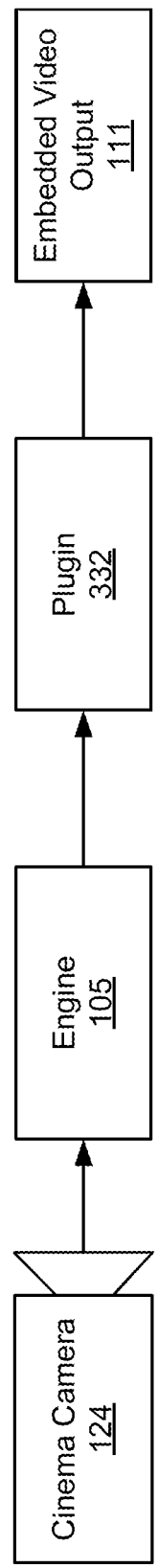
FIG. 4 is a process diagram depicting the flow of metadata in a virtual and mixed reality camera tracking system for live compositing in accordance with an embodiment of the present invention.

Metadata is collected, embedded, sent, and received as shown for example in FIG. 4, in which metadata flows from video camera 124 to engine 105 to plugin 332 and is embedded in video output 111. Metadata is recorded in server 104 and may include the following: camera model or body; type of lens on camera body; image resolution; the color space being recording in; filter (e.g., manually assigned filters such as a neutral density filter); T-Stop (or aperture); F-Stop (still camera/Prosumer version of aperture); shutter angle (video camera version of shutter speed relative to FPS); shutter speed (still camera/Prosumer expression of shutter speed); sensor FPS (frames per second of attached camera); ASA/ISO (light sensitivity of camera sensor); white balance (color temperature of camera sensor); chromatic aberration; creation date of video; creation time, of video; GPS coordinates (position of recording); lens distortion as determined by system; shading/vignetting; camera height (by manual floor measurement or system estimation); and tilt roll (based on positional data of camera).

Metadata is inserted into video input received by server 104, including a timecode, which is driven by timecode generator, focus and zoom pulls, positional data determined by the system, and positional data of camera determined by the tracker.

In system 100, positional tracking data and calibration profiles are communicated through plugin 332 to one or more virtual cameras. Positional tracking data controls the xyz-transforms (camera location coordinates) and updates of the virtual cameras position in real-time. This information can be recorded as animation files and used to recreate previous camera movements and can be applied to other locations, animations. and effects in the process of post-production.

Real-time compositing may be implemented via plugin 332 for various 3D applications and may include the following features: chroma keying, depth masking, machine learning aided matte refinement, object tracking depth refinement, virtual depth occlusion, and stage masking.

The chroma key feature adjusts chroma color, matte strength, luminance values, edge blurring, and other mask/matte parameters. Additionally, depth aided masking may be used, which makes use of a depth matte generated by the tracker to improve the chroma masking. The depth matte is generated by a combination of LIDAR data and depth generated by stereo disparity of the tracker's stereo cameras. The chroma matte and depth matte are then compared using a machine learning approach via the plugin to select or generate a refined matte.

The machine learning aided matte refinement uses a machine learning model trained on sets of depth and chroma mattes retrieved from a cloud based database of mattes of a known quality. This information is used to improve and refine the accuracy of the final refined matte generated or selected by the trained machine learning model. This refined matte is used to generate an alpha for the video camera video to composite over the virtual scene using a custom camera script inside the plugin.

The refined depth matte is also used to achieve virtual depth occlusion. Virtual depth occlusion uses the refined depth matte in conjunction with Lidar and computer vision aided body tracking to virtually occlude elements of the video camera video feed. This allows the software to place virtual objects that are closer to the camera in front of actors or vice versa. For example, if there was a virtual desk in a virtual environment and an actor was to walk in between the virtual desk and the virtual set background, the illusion would break because the actor would appear in front of everything that they pass, including the desk. The desk would not appear in front of the actor blocking out the visibility of his/her legs.

The body tracking enables the plugin to determine the position of an actor's head, body and limbs, for example, in relation to the 3D space of the scene. This information is used to further refine the virtual occlusion of the actor from the virtual scene. In addition, body tracking allows the plugin to have the actors interact with the virtual environment in real-time. For example, knowing the position of an actor's left hand allows the plugin to attach virtual objects to that position, like a virtual torch prop that can then be manipulated by the actor in real time. This also allows the actors to affect the simulated environment in the game engine. For example, virtual objects such as boxes, water, props, etc., may be manipulated by an actor.

Stage masking enables the user to work on any size green screen stage. The user can define a 3D mask volume of viewable space that corresponds to the boundaries of the actual green screen. Once the camera view moves outside of the stage masked area, the virtual environment is rendered.

Figure 5:
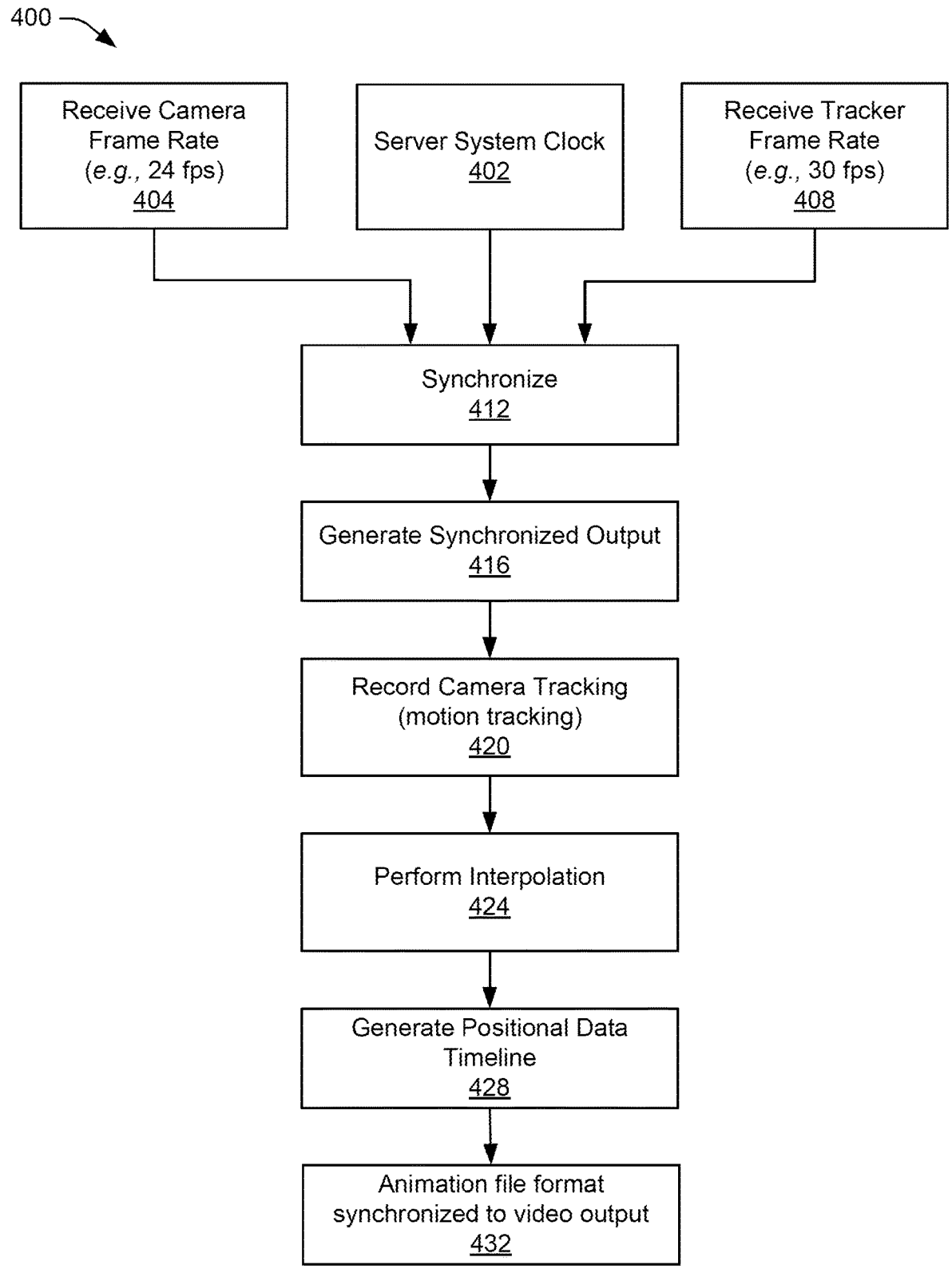
FIG. 5 is a flowchart for a method of synchronizing data from a video camera and a tracker based on frame rate in accordance with an embodiment of the present invention.
Figure 6:
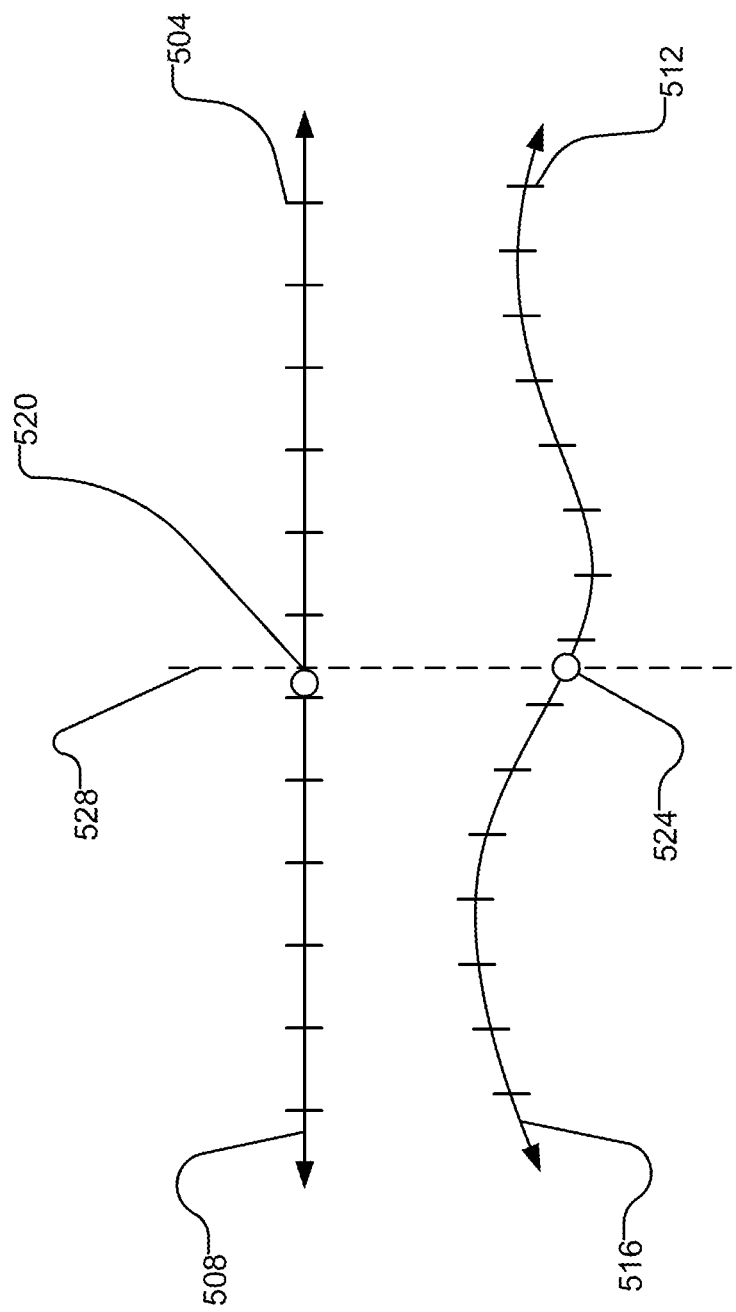
FIG. 6 is an explanatory diagram showing an example of synchronization of variable frame rates between a video camera and a tracker based on interpolation.

Tracker/camera synchronization ensures that the virtual camera moves at the same rate as the video camera. The positional interpolation is done to synchronize recorded video output to positional data over time in addition to synchronizing camera frame rates. The tracker operates with a global shutter at a fixed framerate, which has to synchronize at various frame rates with both global and rolling shutters. This is accounted for by interpolating frames in order to synchronize both data feeds. This process 400 is outlined in FIG. 5, in which data from a service system clock is received at step 402, a video camera frame rate is received at step 404, and a tracker frame rate is received at step 408. Upon receipt of the frame rates, a synchronization is performed at step 412 and synchronized output is generated at step 416. Then camera tracking is recorded at step 420 and synchronized positional information is interpolated based on the frame rates and the positional data associated with each frame at step 424. The positional interpolation is done to synchronize recorded video output to positional data over time in addition to synchronizing camera frame rates. From this interpolation, a positional data timeline is generated at step 428 and then an animation file format is synchronized to video file output at step 432. As shown in an example in FIG. 6, video camera and tracker frame rates may vary and/or drift, so that in order to retain a synchronous relationship between acquired real images/video and the positional data used for compositing, frame positional data are determined for a given frame write based on the then rates of movement to determine positional data at a time between frames. Video camera frame captures 504 are shown along video camera frame rate line 508 and tracker positional data records 512 are shown along tracker line 516. Video camera interpolated position 520 and tracker interpolated position 524 are determined for a given frame write time 528.

In global shutter cameras this is accomplished by frame level synchronization. In rolling shutter cameras synchronization is achieved by creating a common reference with the system clock of the computer. Inter frame interpolation is used for the recording of positional data synchronized with recorded video.

Figure 7:
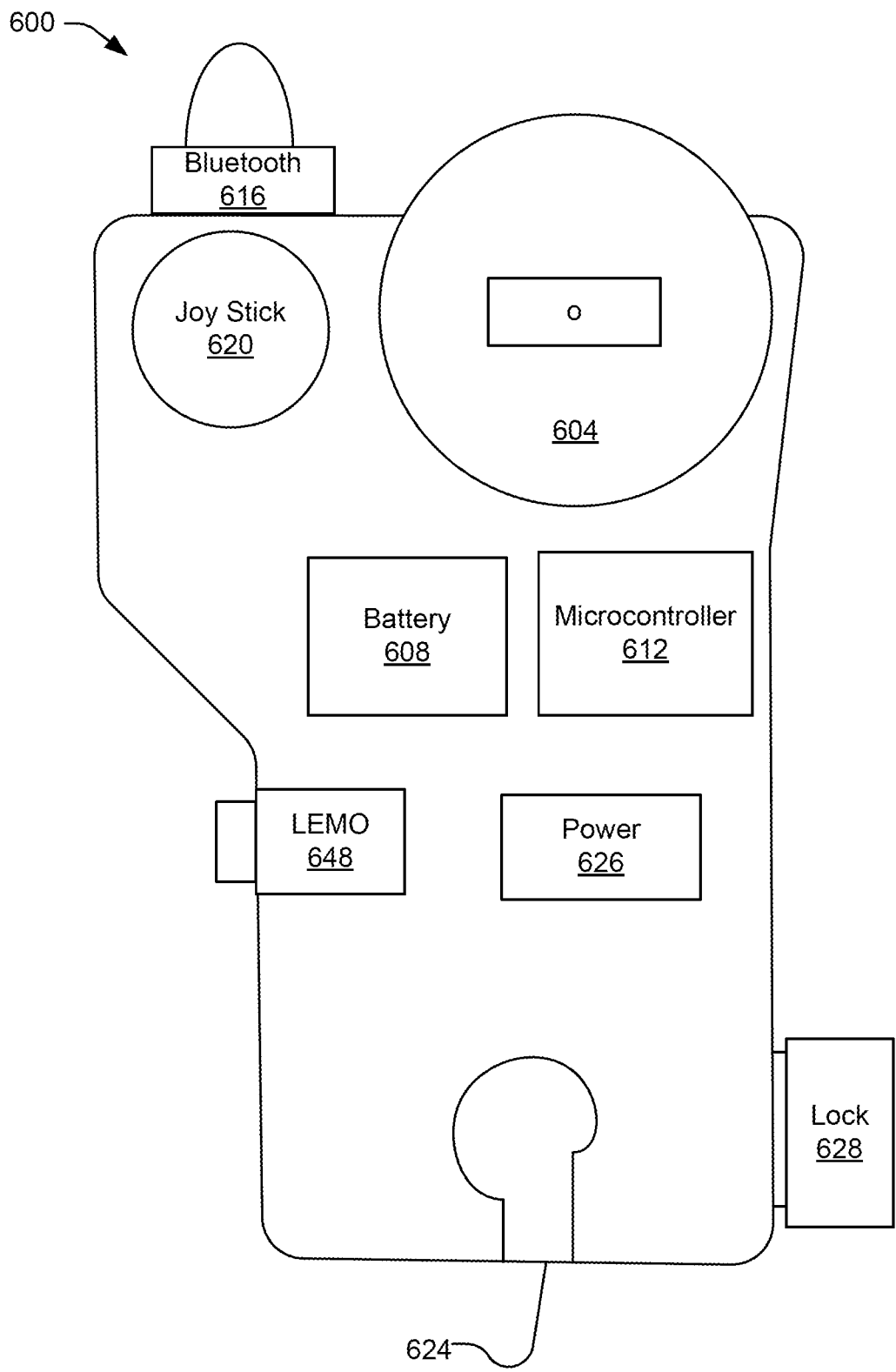
FIG. 7 is a schematic of an encoder in accordance with an aspect of the present invention.

An exemplary rotary encoder device 600 is shown schematically in FIG. 7 and is configured to attach to a lens and/or follow focus rig. Encoder device 600 may include an encoder lens gear 604, a battery 608, a microcontroller 612, a wireless connection component 616, LEMO 618, a controller such as joystick 620, a mechanical connection 624, a power controller 626, and a lock 628. Encoder device 600 communicates focus distance and aperture movement to other components of system 100. This communication can be made in any suitable manner, including for example through a Bluetooth connection from encoder 600 to server 104 where it is interpreted and communicated via plugin 332. Additionally or alternatively, this communication can be via a LEMO connector attached to wireless follow focus devices that support such outputs. For example, the Teradek RT wireless controller or Tilta Nucleus-M products.

Figure 8:
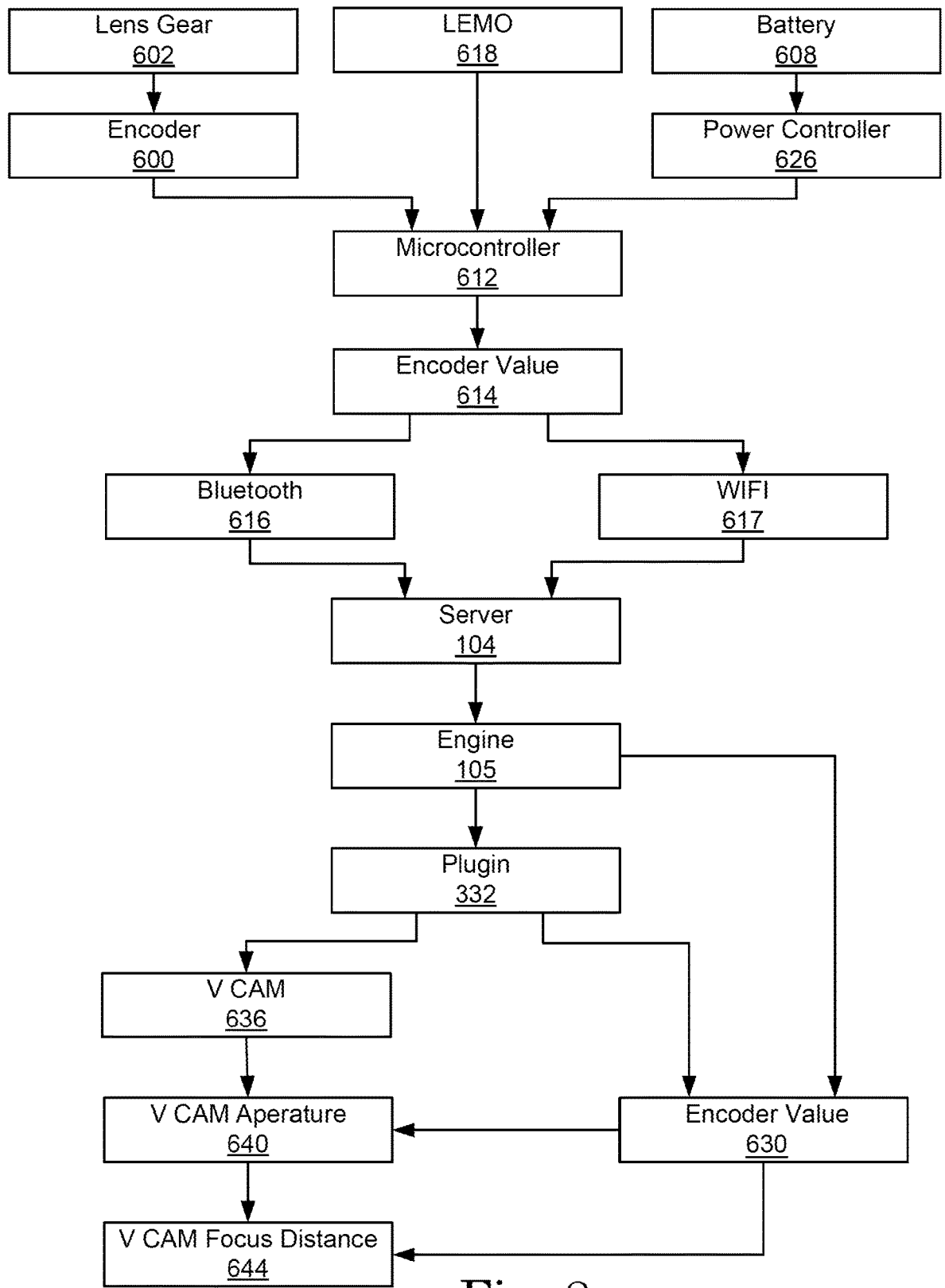
FIG. 8 is a process diagram for a method of encoding a video camera lens for virtual camera parameters.

As outlined in FIG. 8, encoder device 600 is used to relate parameters being used in the video camera lens to server 104 so that parameters of the virtual camera lens can be adjusted in real time. A lens gear 602 is connected to encoder lens gear 604 such that the parameters of lens gear 602 are conveyed to encoder microcontroller 612, which is powered by power controller 626 and in turn battery 608. In addition, encoder 600 can also read follow focus data through a LEMO connector 618 if a supported follow focus system is being used. Based on input from encoder lens gear 604, microcontroller 612 generates an encoder value 614, which is sent to server 104 (via Bluetooth 616 or WiFi 617). The focus distance and aperture data is then calibrated to the virtual lens by registering the lowest possible focal distance or aperture setting on both the video camera and lens. After being processed in server 104 by system engine 105, a virtual encoder value 630 is generated and sent to plugin 332, which connects to a virtual camera 636. Virtual encoder value 630 is then used to set a virtual camera aperture 640 and a virtual camera focus distance 644. In this way, once registered, video camera lens 304 can effectively be used to control the virtual camera lens in real time.

Figure 9:
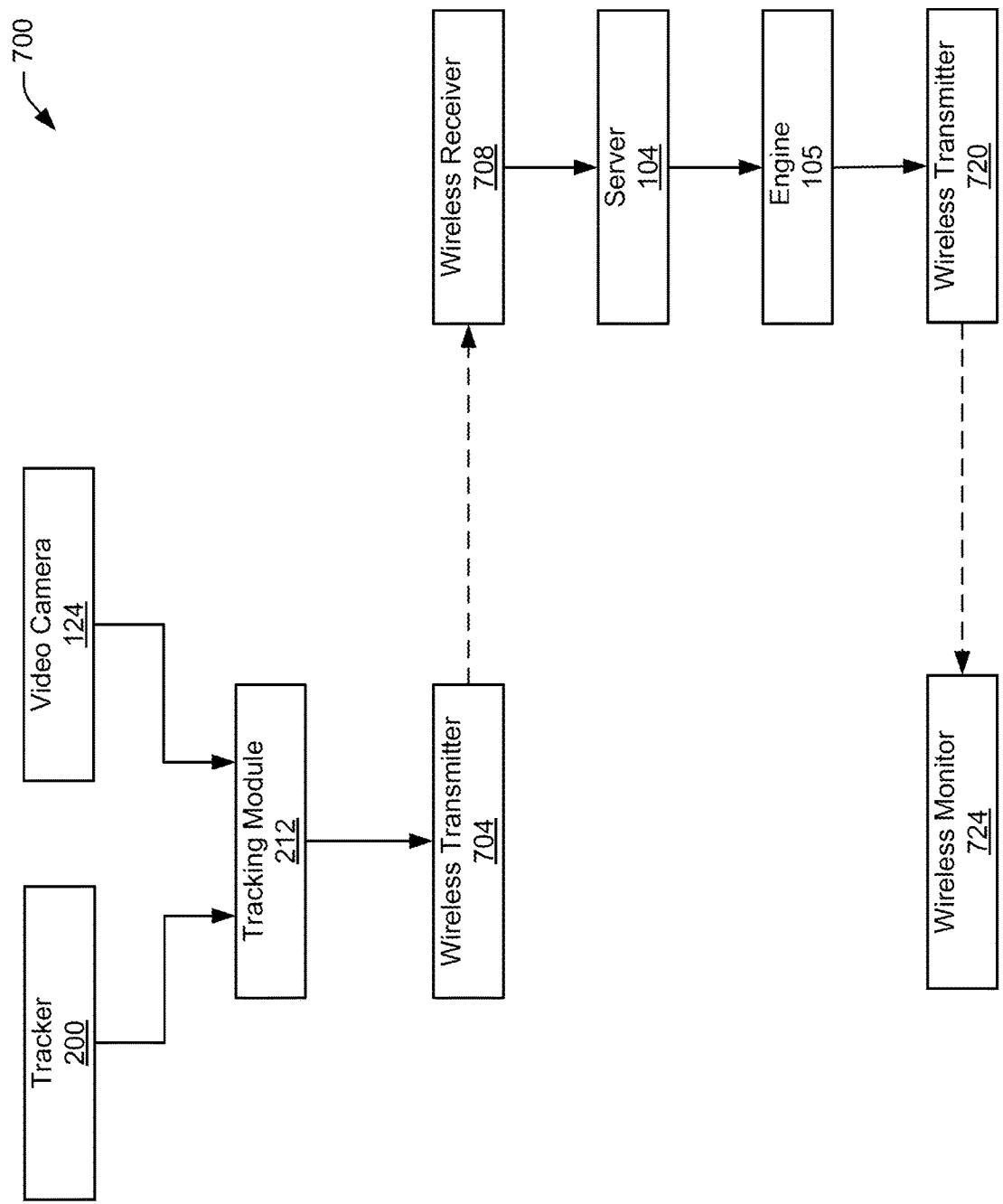
FIG. 9 is a flowchart for wireless transmission of data in the virtual and mixed reality camera tracking system for live compositing in accordance with an embodiment of the present invention.

A wireless system 700 may be used to connect and send data among the components of system 100. As outlined in FIG. 9, wireless system 700 includes tracker 200, video camera 124, tracking module 212, wireless transmitter 704, and wireless receiver 708. Wireless system 700 may be configured for a short range (e.g., 100 meters) or long range (e.g., 1 km using microwave transmission).

Figure 10:
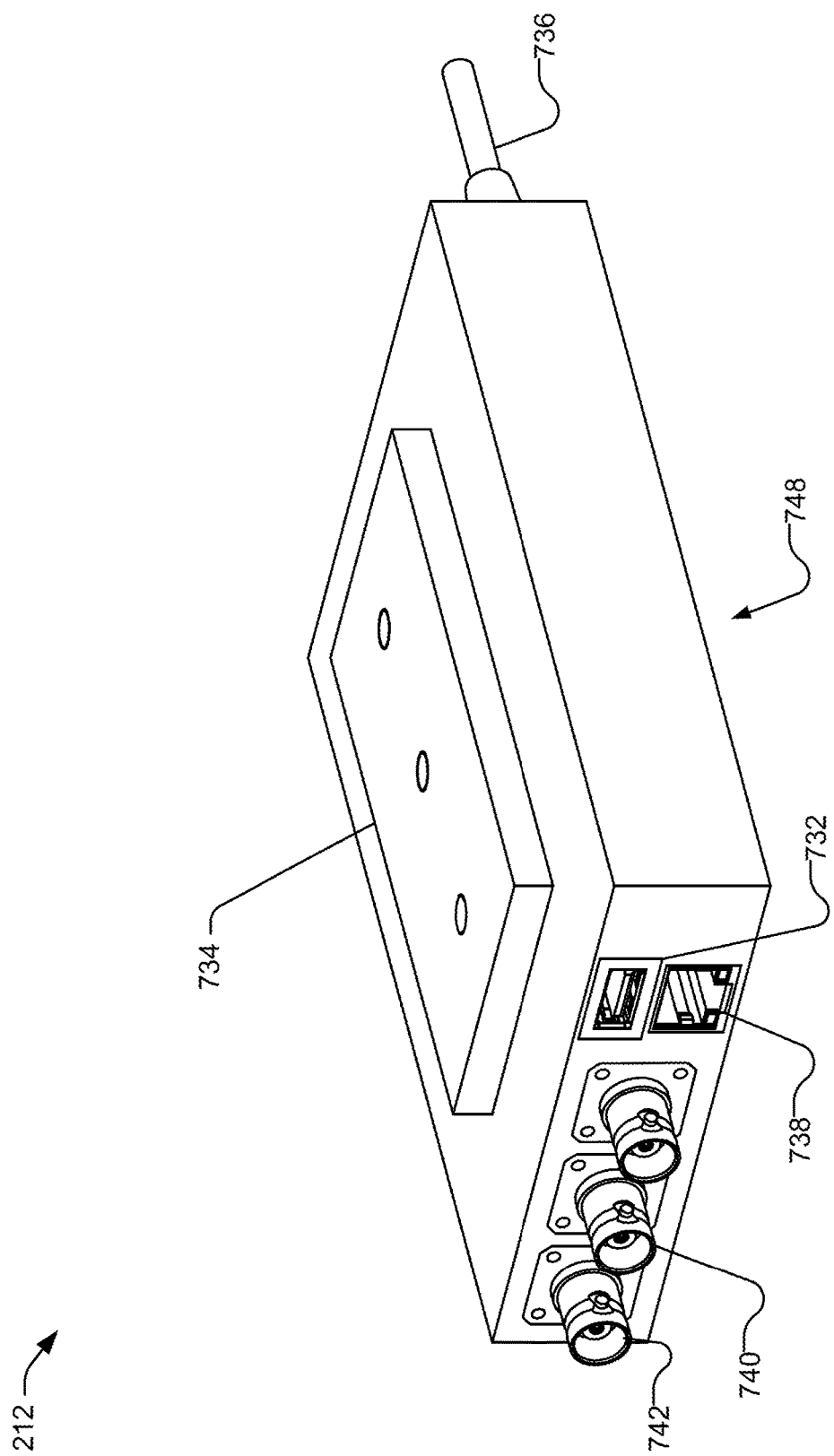
FIG. 10 is a schematic of a wireless tracking module in accordance with an aspect of the present invention.
Figure 11:
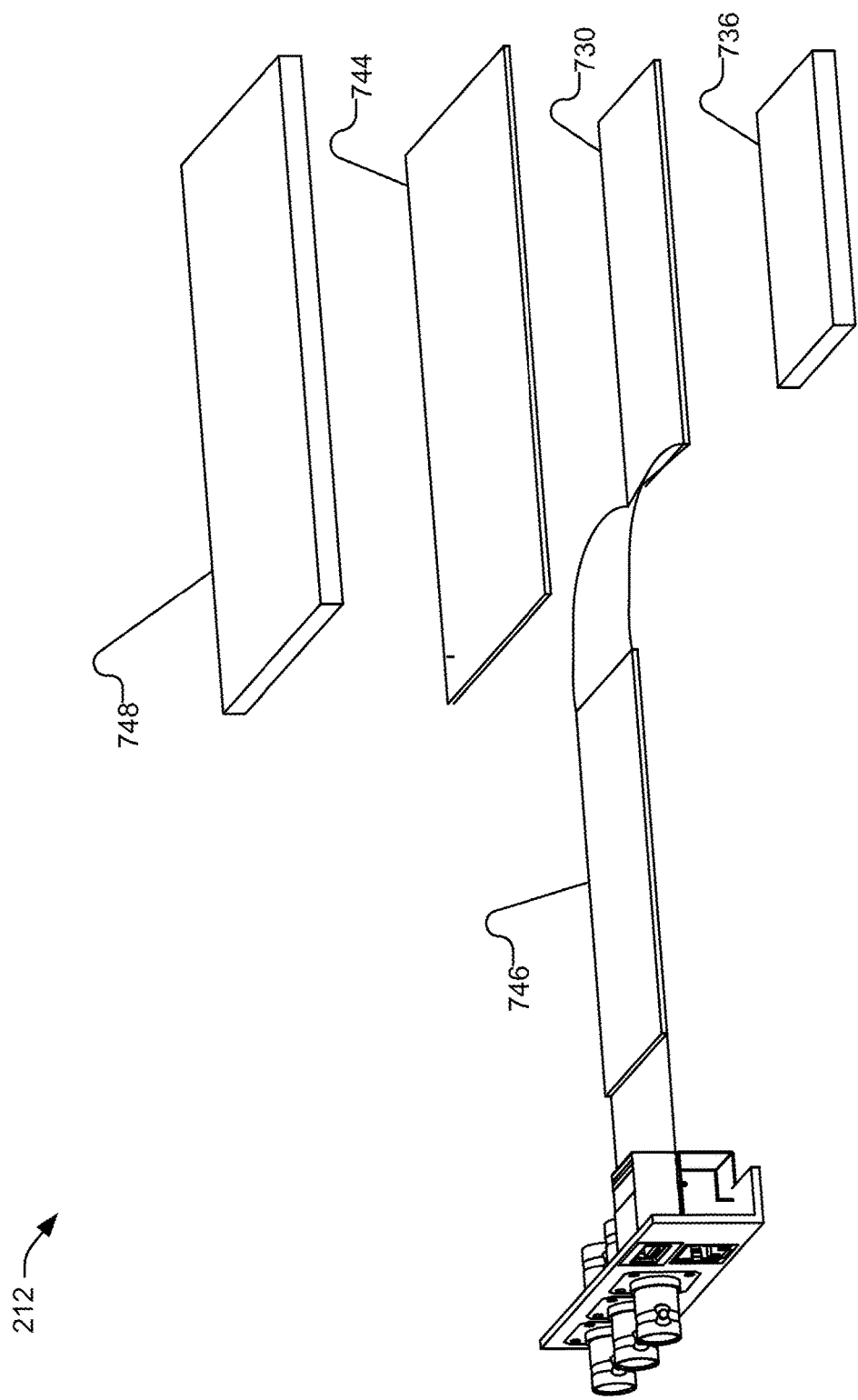
FIG. 11 is a schematic of components of the wireless tracking module of FIG. 10.

Tracker 200 is connected to tracking module 212 by USB Micro-B cable, Ethernet, or other suitable connection. Tracking module 212 may be a server that is configured to support wireless video and tracking. Tracking module 212, an exemplary version of which is shown in FIGS. 10-11, includes a miniature m.2 SDI capture card 730 or other video capture devices to receive video input from the video camera. This video data is multiplexed with the tracking data received via a Micro-B port 732 or other connection to server and a mobile engine, and then sent via NDI, TCP, or other protocol to a wireless transmitter 704. Tracking module 212 may also include a mount 734 with connections, a power input 736, an ethernet connector 738, an SDI in port 740, and an SDI out port 742, as well as a board 744, SDI cable 746, and cooler 748.

Transmitter 704 and receiver 708 may use Dual-band RF Antenna for short range and microwave wireless bridges for long range. In order to avoid/limit interference from multiple wireless signals, positional and video data are combined into one signal that is transmitted wirelessly and then deconstructed into separate positional data and video data upon receipt.

On receipt of video and tracking data by server 104, engine 105 corrects for any latency introduced by wireless network and reroutes the data through connected 3D software applications, creating a real-time composite of video camera images and virtual camera images motion tracking in synchronization over wireless connections, which may then be transmitted via a wireless transmitter 720 to a wireless monitor 724 for real time viewing of composited video feed.

The above described camera tracking system allows for real-time compositing so that composite video can be generated and viewed while real filming is occurring. The real time compositing is facilitated by plugin 332 and can be used in conjunction with the various 3D applications noted above. The compositing features, which are described in more detail above, include chroma keying, depth masking, machine learning aided matte refinement, body tracking depth refinement, virtual depth occlusion, and stage masking.

Figure 12:
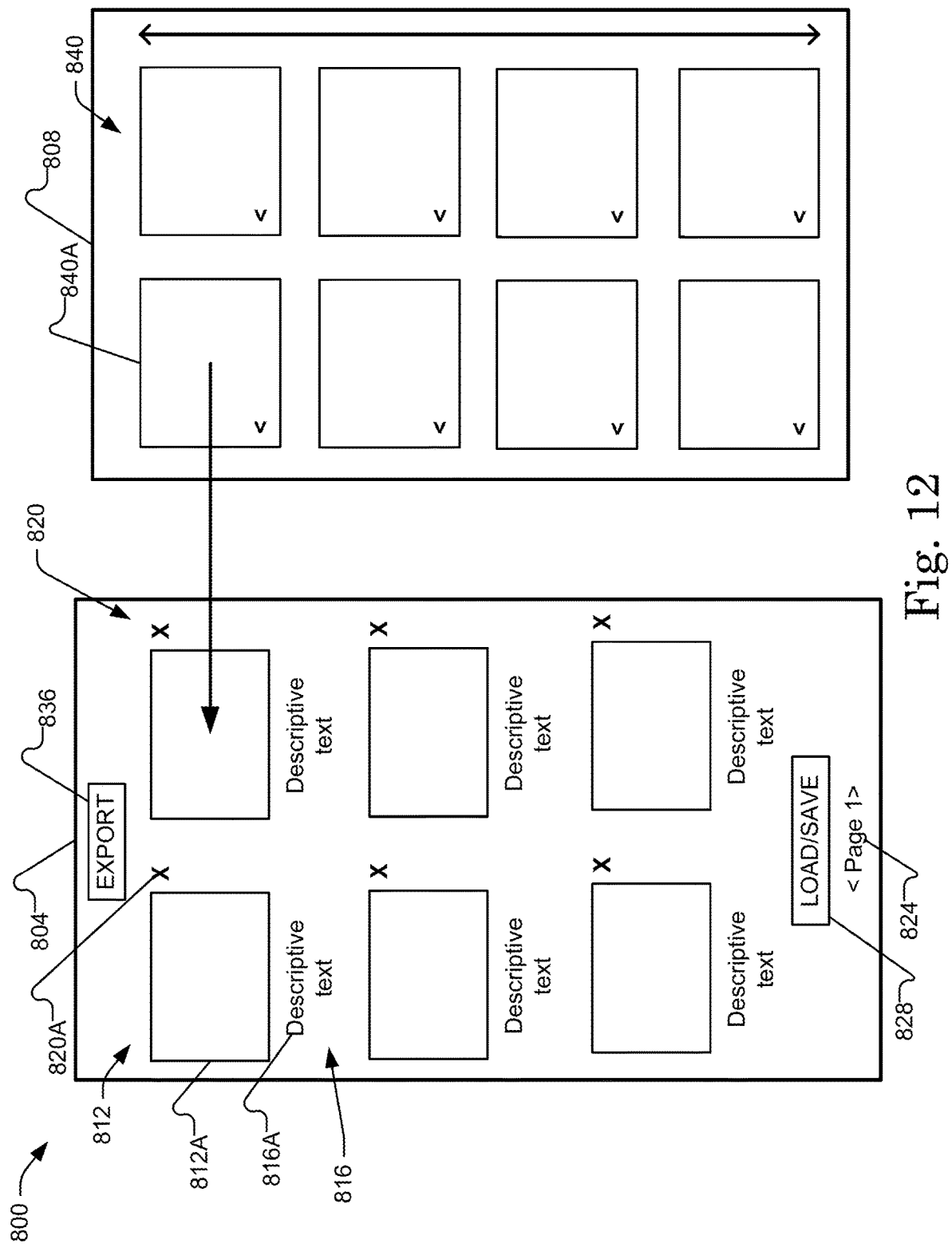
FIG. 12 illustrates a process for virtual storyboarding in accordance with another aspect of the present invention.

In operation, the above described camera tracking and live compositing system further allows for virtual storyboarding that includes a visual save system for virtual production scenes. As shown in an example in FIG. 12, a storyboard interface 800 may include a storyboard palette 804 and an image gallery 808. Storyboard palette 804 includes one or more storyboard images 812 (e.g., 812A), a description 816 (e.g., 816A) associated with each respective storyboard image 808, a remove image option 820 (e.g., 820A) for each respective storyboard image 808, a page select 824, a load/save storyboard option 828, and a load/save data option (such as by double clicking). In addition, an export option 836 exports all data associated with an image 812 to an associated storyboard image file, which may include any of the following: scene state data, such as geometry, lighting information, and project settings; lens parameters, such as focal length and distortion; camera parameters, such as model and settings; and metadata, such as date and location of image capture. Image gallery 808 includes thumbnail images 840 (e.g., 840A) that can be selected and sent to storyboard palette 804.

In this way, photographs are captured from inside a virtual scene with the click of a button. When photographs are captured in this manner, all of the positional coordinates, camera settings, and scene settings are recorded along with the photograph and this data is attached to the image within the image's metadata. Each such photo with its associated date is then placed in a storyboard library. The metadata attached to each photograph can be used to quickly reload virtual scenes with all of the scene's original settings that were in place when the virtual photograph was taken. Every photograph taken is immediately placed in the storyboard library to be used as reference further down the production pipeline or exported as a printable file of storyboard images.

This virtual storyboarding feature works in conjunction with the tracker to save positional coordinates, camera settings, and scene settings within metadata stored in storyboard image files. By clicking on any image in the storyboard library, the associated metadata information can be used to load the same virtual scene from the same location of the video camera placement, with the same virtual camera's settings and original scene settings/parameters present when the original virtual photograph was taken. A storyboard save/load feature allows the user to share storyboard images with other production personnel to load specific scene states, camera positions, lighting setups, and camera/lens calibration packages.

In an embodiment, a camera tracking and live compositing system is provided including a video camera having a lens and generating a video camera feed, a tracking device attached to the video camera, an encoder attached to the lens, wherein the encoder is configured to track a plurality of lens parameters of the lens, including a focal length, an aperture, and a focal distance, a composite monitor, and a processor configured to receive the video camera feed, positional tracking data from the tracking device, and the plurality of lens parameters from the encoder and to output a composited video feed to the composite monitor in real time, wherein the composite video feed includes the video camera feed and virtual elements from a virtual camera, wherein the virtual elements from the virtual camera include at least one object that is positioned within a scene of the composite video based on video and tracking offsets derived from positional tracking data from the tracking device, wherein the virtual elements are constructed using virtual lens distortion parameters derived from the plurality of lens parameters, and wherein the virtual elements are scaled based on a geometry scale derived from the positional tracking data, the video feed, and the plurality of lens parameters.

Additionally or alternatively, the tracking device includes a housing and the housing is attached to the video camera.

Additionally or alternatively, the housing includes a camera mount.

Additionally or alternatively, the tracking device includes stereo cameras, and wherein the stereo cameras generate a stereo camera feed.

Additionally or alternatively, the tracking device includes a video capture device to receive video input from the video camera, port for connecting to the processor, an ethernet connector, an SDI in port, an SDI out port, a board, an SDI cable, and a cooler.

Additionally or alternatively, wherein the processor generates an intrinsic calibration file based on the plurality of lens parameters and the video feed, wherein the processor generates an extrinsic calibration file based on the stereo camera feed and the video camera feed, and wherein the processor generates a room scale calibration file based on the plurality of lens parameters, the positional tracking data, and the video feed.

T Additionally or alternatively, the processor determines configuration settings of the virtual camera based on information from the intrinsic calibration file, the extrinsic calibration file, and the room scale calibration file.

Additionally or alternatively, the configuration settings include a virtual camera aperture and a virtual camera focus distance.

Additionally or alternatively, the processor is further configured to receive depth data from the tracking device, generate a depth matte based at least on the depth data, and generate a refined matte based at least on the depth matte.

Additionally or alternatively, the processor is configured to load and execute a trained machine model to generate the refined matte based at least on the depth matte and at least one matte of known quality.

Additionally or alternatively, the video camera feed includes a physical object and wherein the processor generates, based at least on the refined matte, the composited video feed that includes images in which the physical object is at least partially occluded by a virtual object.

Additionally or alternatively, the composite video feed is transmitted to the composite monitor by wireless transmission.

Additionally or alternatively, the video camera includes a video frame rate and the positional tracking device includes a tracker frame rate, and wherein the video frame rate and the tracker frame rate are synchronized to a server system clock.

Additionally or alternatively, the encoder further includes a lens gear connected to a follow focus.

Additionally or alternatively, a recorder is included for recording the composite video feed in real time.

Additionally or alternatively, a memory connected to the processor is included, wherein the memory stores an image captured by the video camera that are associated with information about the image including scene state data, the plurality of lens parameters, a plurality of video camera parameters, and metadata.

Additionally or alternatively, scene state data includes geometry, lighting information, and project settings, wherein the plurality of lens parameters include focal length and distortion, wherein the plurality of video camera parameters include camera model and settings, and wherein the metadata includes a date, and a location of the image capture.

In an embodiment, a method of camera tracking and compositing includes receiving a video feed from a video camera, receiving positional data of the video camera from a tracking device attached to the video camera, receiving a plurality of lens parameters from an encoder connected to a lens of the video camera, generating an intrinsic calibration file based on the plurality of lens parameters and the video feed, generating an extrinsic calibration file based on the positional data and the video feed, generating a room scale calibration file based on the plurality of lens parameters, the positional data, and the video feed, generating a composite video feed from the video feed and a virtual camera, wherein a plurality of lens distortion parameters of the virtual camera are set based on the intrinsic calibration file, and displaying the composite video in real time.

Additionally or alternatively, the method includes tracking an object in the composite video feed using camera and tracking offsets derived from the extrinsic calibration file.

Additionally or alternatively, the method includes adjusting a geometry scale of the virtual camera based on the room scale calibration file.

Additionally or alternatively, the method includes synchronizing a video frame rate of the video camera and a tracking frame rate of the tracking device by generating a timeline from a server system clock, generating synchronized output for a plurality of frames from the video feed and a plurality of corresponding data points from the positional data, interpolating the positional data to determine interpolated positions at selected times on the timeline for the plurality of frames and the plurality of corresponding data points, and generating a positional data timeline.

Additionally or alternatively, the method includes generating an encoder value from a lens gear connected to a lens on the video camera and adjusting a virtual camera focus distance and a virtual camera aperture of the virtual camera based on the encoder value.

Additionally or alternatively, the method includes storing a plurality of images captured from the video feed and storing, in association with each respective image of the plurality of images, information about each respective image including scene state data, lens parameter data, video camera parameters, and metadata.

Additionally or alternatively, the lens parameter data includes focal length and distortion, wherein the camera parameters include camera model and settings, and wherein the metadata includes a date and a location for the capture of each of the plurality of images.

Additionally or alternatively, the method includes displaying at least some of the plurality of images in a gallery and transmitting the information about a selected one of the displayed plurality of images to the virtual camera.

Additionally or alternatively, the method includes displaying the composite video feed on a monitor in real time.

Additionally or alternatively, the method includes recording the composite video feed in real time.

Additionally or alternatively, the method includes determining configuration settings of the virtual camera based on information from the intrinsic calibration file, the extrinsic calibration file, and the room scale calibration file.

Additionally or alternatively, the configuration settings include a virtual camera aperture and a virtual camera focus distance.

Additionally or alternatively, the method includes receiving depth data from the tracking device, generating a depth matte based at least on the depth data, and generating a refined matte based at least on the depth matte.

Additionally or alternatively, the method includes generating the refined matte based at least on the depth matte and at least one matte of known quality.

Additionally or alternatively, the composited video feed includes images in which a physical object included in the video feed is at least partially occluded by a virtual object based at least on the refined matte.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A method of camera tracking and compositing comprising: receiving a video feed from a video camera;
   receiving positional data of the video camera from a tracking device attached to the video camera;
   receiving a plurality of lens parameters from an encoder connected to a lens of the video camera;
   generating an intrinsic calibration file based on the plurality of lens parameters and the video feed;
   generating an extrinsic calibration file based on the positional data and the video feed;
   generating a room scale calibration file based on the plurality of lens parameters, the positional data, and the video feed;
   generating a composite video feed from the video feed and a virtual camera, wherein a plurality of lens distortion parameters of the virtual camera are set based on the intrinsic calibration file;
   displaying the composite video in real time;
   tracking an object in the composite video feed using camera and tracking offsets derived from the extrinsic calibration file;
   adjusting a geometry scale of the virtual camera based on the room scale calibration file;
   synchronizing a video frame rate of the video camera and a tracking frame rate of the tracking device by:
   generating a timeline from a server system clock;
   generating synchronized output for a plurality of frames from the video feed and a plurality of corresponding data points from the positional data;
   interpolating the positional data to determine interpolated positions at selected times on the timeline for the plurality of frames and the plurality of corresponding data points; and generating a positional data timeline;
   generating an encoder value from a lens gear connected to a lens on the video camera and adjusting a virtual camera focus distance and a virtual camera aperture of the virtual camera based on the encoder value; and
   storing a plurality of images captured from the video feed and storing, in association with each respective image of the plurality of images, information about each respective image including scene state data, lens parameter data, video camera parameters, and metadata, wherein the lens parameter data includes focal length and distortion, wherein the camera parameters include camera model and settings, and wherein the metadata includes a date and a location for the capture of each of the plurality of images.

2. The method of camera tracking and compositing according to claim 1, further including displaying at least some of the plurality of images in a gallery and transmitting the information about a selected one of the displayed plurality of images to the virtual camera.

* * * * *